(12) United States Patent
Urmaza

(10) Patent No.: US 6,520,685 B1
(45) Date of Patent: Feb. 18, 2003

(54) THRUST BEARING WITH HEAVY-DUTY ANTI-REVERSAL FEATURE

(75) Inventor: Matthew G. Urmaza, New Hartford, CT (US)

(73) Assignee: The Torrington Company, Torrington, CT (US)

(*) Notice: Subject to any disclaimer, the term of this patent is extended or adjusted under 35 U.S.C. 154(b) by 0 days.

(21) Appl. No.: 09/963,315

(22) Filed: Sep. 26, 2001

(51) Int. Cl.[7] ............................................. F16C 19/30
(52) U.S. Cl. ...................... 384/620; 384/618; 384/621; 384/622
(58) Field of Search ................................ 384/618, 619, 384/620, 621, 622, 623

(56) References Cited

U.S. PATENT DOCUMENTS

| | | | |
|---|---|---|---|
| 836,672 A | 11/1906 | Foote | |
| 1,106,065 A | 8/1914 | Vandegrift | |
| 1,649,285 A | 11/1927 | Buckwalter | |
| 2,724,234 A | 11/1955 | Meyer | |
| 2,854,300 A | 9/1958 | Winchell | |
| 2,997,349 A | 8/1961 | Pitner | |
| 3,365,040 A | 1/1968 | Pitner | |
| 3,712,693 A | 1/1973 | Root et al. | |
| 3,981,549 A | 9/1976 | Carullo | |
| 4,042,309 A | * 8/1977 | Hiraga | 384/621 |
| 4,466,751 A | 8/1984 | Higuchi | |
| 4,566,578 A | 1/1986 | Leigh-Monstevens et al. | |
| 4,696,588 A | 9/1987 | Tanaka et al. | |
| 4,733,979 A | 3/1988 | Tsuruki | |
| 4,783,183 A | 11/1988 | Gardella | |
| 4,892,424 A | 1/1990 | Christenson et al. | |
| 4,910,847 A | 3/1990 | Christenson et al. | |
| 4,981,373 A | 1/1991 | Bando | |
| 5,114,249 A | 5/1992 | Muntnich et al. | |
| 5,199,802 A | 4/1993 | Shinohara et al. | |
| 5,335,998 A | 8/1994 | Muntnich et al. | |
| RE34,813 E | * 12/1994 | Gardella | 384/620 |
| 5,474,390 A | 12/1995 | Rhoads | |
| 5,630,670 A | 5/1997 | Griffen et al. | |
| 5,647,675 A | * 7/1997 | Metten et al. | 384/620 |
| 5,967,673 A | * 10/1999 | Kenney et al. | 384/620 |
| 5,967,674 A | * 10/1999 | Reubelt et al. | 384/620 |

FOREIGN PATENT DOCUMENTS

| | | | | |
|---|---|---|---|---|
| FR | 1324691 | * | 3/1963 | 384/618 |
| JP | 401295024 A | * | 11/1989 | 384/618 |

* cited by examiner

*Primary Examiner*—Thomas R. Hannon
(74) *Attorney, Agent, or Firm*—Michael Best & Friedrich LLP

(57) ABSTRACT

Rollers are aligned radially within a bearing cage, for rolling contact with a first thrust washer concentric with the bearing cage. The first thrust washer has a flat raceway portion and a curled portion that wraps around a portion of the bearing cage to retain the bearing cage and the first thrust washer together as an assembly. The curled portion includes a rim that extends radially 360 degrees with respect to the axis of the thrust washer and has a folded configuration such that a doubled portion is offset with respect to an axial midpoint of the thrust bearing to prevent the thrust bearing from being installed with a reversed orientation.

10 Claims, 1 Drawing Sheet

THRUST BEARING WITH HEAVY-DUTY ANTI-REVERSAL FEATURE

BACKGROUND OF THE INVENTION

Figure 1:
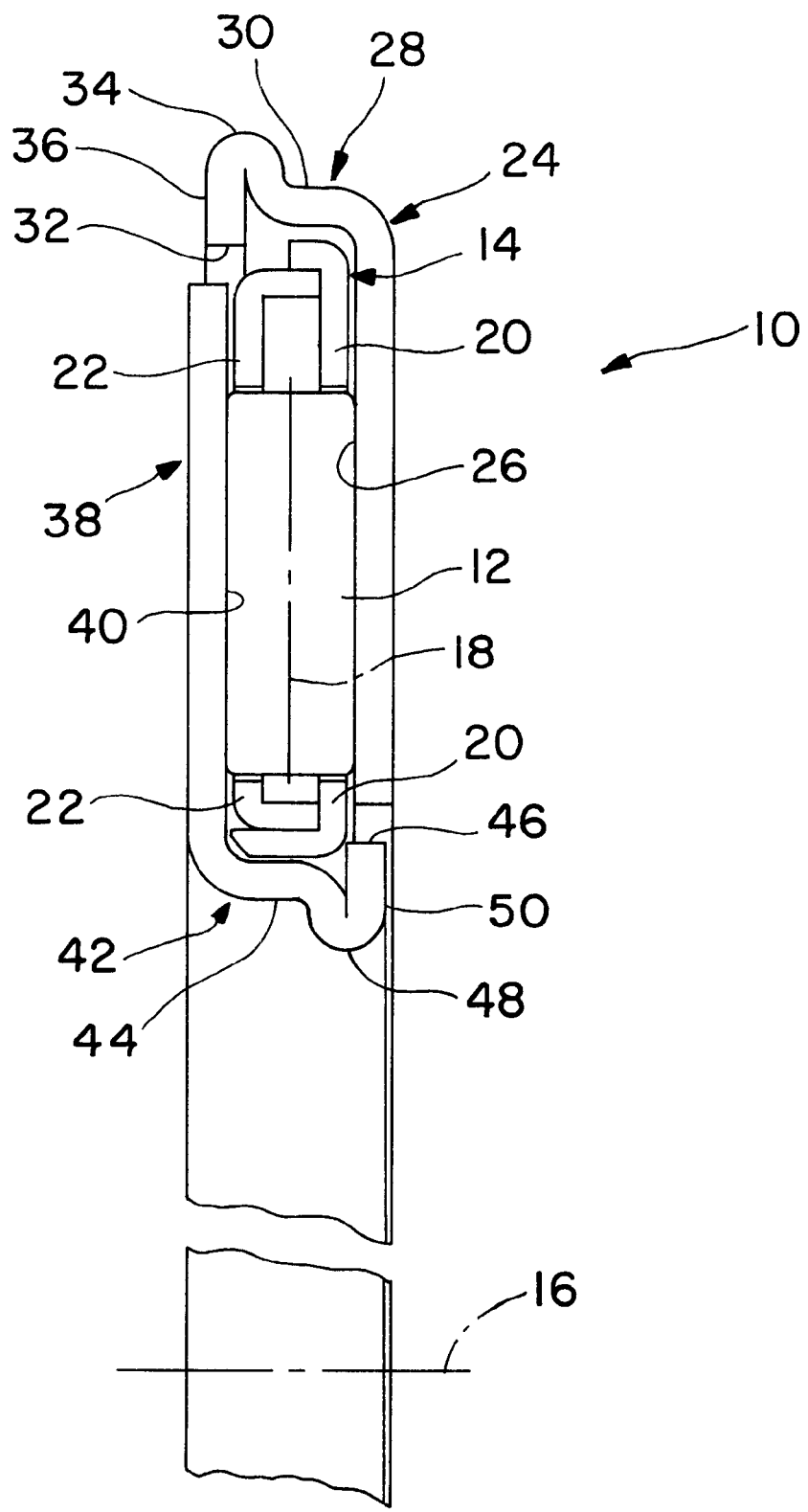

This invention relates generally to thrust bearings with rolling elements and, more particularly, to rolling element thrust bearings with anti-reversal features.

Thrust bearings with rolling elements are in general use in transmissions and similar devices to support axial loads between components. For example, such thrust bearings are used in automotive torque converters to position and support a stator. To function correctly, the thrust bearing must be oriented with a specific face against the stator or other housing. Typically, such thrust bearings are painted with a stripe to indicate the face of the thrust bearing that is to face outward from the stator or other housing, and the thrust bearing is placed into a recess of the housing.

Some thrust bearings have been equipped with anti-reversal tabs that extend so as to interfere with the recess in the housing and prevent inadvertent installation of the thrust bearing when in a reversed orientation. However, with anti-reversal tabs that are turned radially outward, problems have occurred when a stack height checking machine applied a programmed load, breaking the tab. And, with anti-reversal tabs that are turned radially inward, so as to interfere with a shaft or other piloting surface, catastrophic failures have occurred due to out of roundness and inner retainer wear.

The foregoing illustrates limitations known to exist in present devices and methods.

Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a thrust bearing comprising a plurality of rollers retained within a bearing cage, the rollers being aligned radially with respect to an axis of the bearing cage, and a first thrust washer concentric with the bearing cage. The first thrust washer has a flat raceway portion for rolling contact of the rollers and a curled portion that wraps around a portion of the bearing cage to retain the bearing cage and the first thrust washer together as an assembly. The curled portion includes a rim that extends radially 360 degrees with respect to the axis and has a folded configuration such that a doubled portion is offset with respect to an axial midpoint of the thrust bearing to prevent the thrust bearing from being installed with a reversed orientation.

The foregoing and other aspects will become apparent from the following detailed description of the invention when considered in conjunction with the accompanying drawing figures.

BRIEF DESCRIPTION OF THE DRAWING FIGURES

FIG. 1 is a cross sectional view of a thrust bearing with a heavy-duty anti-reversal feature illustrating the present invention.

DETAILED DESCRIPTION

Referring now to the drawing, FIG. 1 illustrates thrust bearing 10, according to one embodiment of the present invention. A plurality of rollers 12 is retained within a bearing cage 14, with the rollers 12 being aligned radially with respect to an axis 16 of the bearing cage 14. That is, several rollers 12 are arranged in a plane with roller centerlines 18 directed to intersect the axis 16 at a common point. The bearing cage 14 may have a box configuration comprising cage members 20 and 22, as shown, may have a sigma configuration made of a single member, or may have other known bearing cage configurations.

An outer thrust washer 24, concentric with the bearing cage 14, hence also having axis 16, has a flat raceway portion 26 for rolling contact of the rollers 12. The outer thrust washer 24 also has a curled portion 28 that wraps around a portion of the bearing cage 14 to retain the bearing cage 14 and the outer thrust washer 24 together as an assembly. In the embodiment of FIG. 1, the curled portion 28 extends axially, with a cylindrical configuration 30, radially outward of the bearing cage 14, such that the cage may be piloted thereby, if desired. The curled portion 28 terminates with a radially inwardly extending lip 32 that has a reduced diameter such that the bearing cage 14 is retained thereby.

Between the cylindrical configuration 30 and the lip 32, the curled portion 28 forms a rim 34 that extends radially 360 degrees with respect to the axis 16 and has a folded configuration such that a doubled portion 36 is offset with respect to an axial midpoint of the thrust bearing 10 to prevent the thrust bearing 10 from being installed with a reversed, or backwards, orientation. Specifically, the rim 34 interferes with a recess of a housing into which the thrust bearing 10 is to be installed, such that the thrust bearing will either fail to seat in the recess or will only partially seat in the recess, extending axially outward sufficiently to be detected by a stack height machine.

Significantly, because the rim 34 extends around the full circumference of the first thrust washer 14, and because the rim 34 is a doubled thickness of the material (for example, sheet steel or other metal formed by drawing or stamping) forming the outer thrust washer 14, the rim 34 is robust and will not break when improper orientation of the thrust bearing 10 subjects the rim 34 to a high programmed load of a stack height check machine.

FIG. 1 also illustrates that the robust, heavy-duty anti-reversal feature of the present invention may be incorporated in an inner thrust washer 38. Inner thrust washer 38 is concentric with the bearing cage 14 and has a flat raceway portion 40 for rolling contact of the rollers 12 and curled portion 42 that wraps around a portion of the bearing cage 14 to retain the bearing cage and the inner thrust washer 38 as an assembly. The curled portion 42 extends axially, with a cylindrical configuration 44, radially inward of the bearing cage 14, such that the cage may be piloted thereby, if desired. The curled portion 42 terminates with a radially outwardly extending lip 46 that has an increased diameter such that the bearing cage 14 is retained thereby.

Between the cylindrical configuration 44 and the lip 46, the curled portion 42 forms a rim 48 that extends radially 360 degrees with respect to the axis 16 and has a folded configuration such that a doubled portion 50 is offset with respect to an axial midpoint of the thrust bearing 10 to prevent the thrust bearing 10 from being installed with a reversed, or backwards orientation. Similar to the rim 34, the rim 48 interferes with a recess of a housing into which the thrust bearing 10 is to be installed, such that the thrust bearing will either fail to seat in the recess or will only partially seat in the recess, affecting the stack height of the installation.

The thrust bearing of the present invention may have the anti-reversal feature (rim 34 or rim 48) on either an outer thrust washer or an inner thrust washer, or on both thrust washers. Also, the thrust bearing of the present invention may comprise two thrust washers and a bearing cage and rollers retained together as an assembly. Alternatively, the thrust bearing of the present invention may comprise only a single thrust washer retained together with a bearing cage and rollers, for subsequent installation against a separate raceway component.

Having described the invention, what is claimed is:

1. A thrust bearing comprising:

a plurality of rollers retained within a bearing cage, the rollers being aligned radially with respect to an axis of the bearing cage; and a first thrust washer concentric with the bearing cage and having a flat raceway portion for rolling contact of the rollers and a curled portion that wraps around a portion of the bearing cage to retain the bearing cage and the first thrust washer together as an assembly;

the curled portion including a rim that extends radially 360 degrees with respect to the axis and has a folded configuration such that a doubled portion is offset with respect to an axial midpoint of the thrust bearing to prevent the thrust bearing from being installed with a reversed orientation.

2. A thrust bearing according to claim 1, further comprising a second thrust washer that wraps around a portion of the bearing cage to retain the bearing cage and the second thrust washer together with the first thrust washer as an assembly.

3. A thrust bearing according to claim 2, wherein the second thrust washer includes an anti-reversal feature.

4. A thrust bearing according to claim 1, wherein the rim of the curled portion of the first thrust washer extends radially outwardly.

5. A thrust bearing according to claim 1, wherein the rim of the curled portion of the first thrust washer extends radially inwardly.

6. A thrust bearing according to claim 1, wherein the first thrust washer is formed of sheet metal by drawing or stamping.

7. A thrust bearing according to claim 6, wherein the first thrust washer has a substantially uniform thickness except for the doubled portion that has approximately twice the thickness of other portions of the thrust washer.

8. A thrust bearing according to claim 1, wherein the doubled portion of the first thrust washer extends radially to form a lip that is engageable with the bearing cage to retain the bearing cage and the first thrust washer together as an assembly.

9. A thrust bearing according to claim 1, wherein the bearing cage has a box-type configuration.

10. A thrust bearing according to claim 1, wherein the first thrust washer includes a cylindrical configuration between the flat raceway portion and the folded configuration of the rim.

\* \* \* \* \*